(12) United States Patent
Huntley

(10) Patent No.: US 8,572,793 B1
(45) Date of Patent: Nov. 5, 2013

(54) PORTABLE FISHING LURE CLEANER

(71) Applicant: Tony R. Huntley, Milwaukie, OR (US)

(72) Inventor: Tony R. Huntley, Milwaukie, OR (US)

(*) Notice: Subject to any disclaimer, the term of this patent is extended or adjusted under 35 U.S.C. 154(b) by 0 days.

(21) Appl. No.: 13/647,271

(22) Filed: Oct. 8, 2012

(51) Int. Cl.
*A46B 11/00* (2006.01)

(52) U.S. Cl.
USPC .................................. 15/104.92; 15/104.94

(58) Field of Classification Search
USPC ................... 15/21.1, 104.92, 104.94
See application file for complete search history.

(56) References Cited

U.S. PATENT DOCUMENTS

| 2,846,705 A | * | 8/1958 | Marz | 401/10 |
| 4,237,641 A | * | 12/1980 | Gupton | 43/25 |

* cited by examiner

*Primary Examiner* — Randall Chin
(74) *Attorney, Agent, or Firm* — Mark S. Hubert

(57) ABSTRACT

A fishing lure cleaner for scouring the exterior surface of Kwikfish® and Flatfish® style of fishing lures, has a removable top section that traps the nose of the fishing lure in a slot or a wedge depending upon the size of the lure. A retractable hook extends from the top section and further secures the lure from one of its eyelets. The hook is plunged into the bottom section, which houses a cylindrical array of stiff bristles that scours the lure.

11 Claims, 5 Drawing Sheets

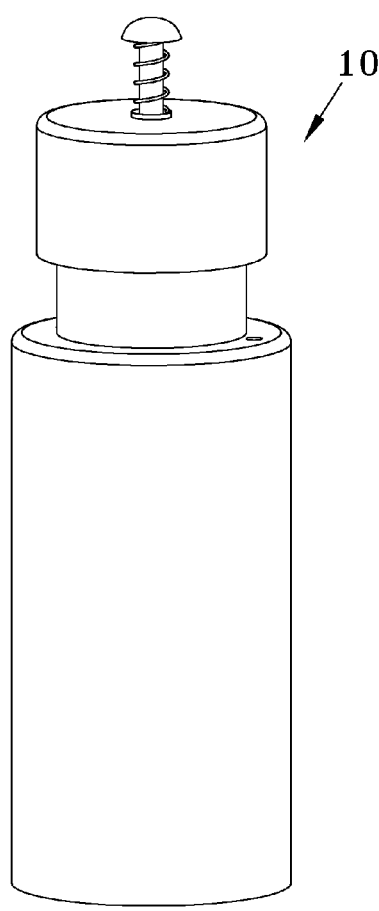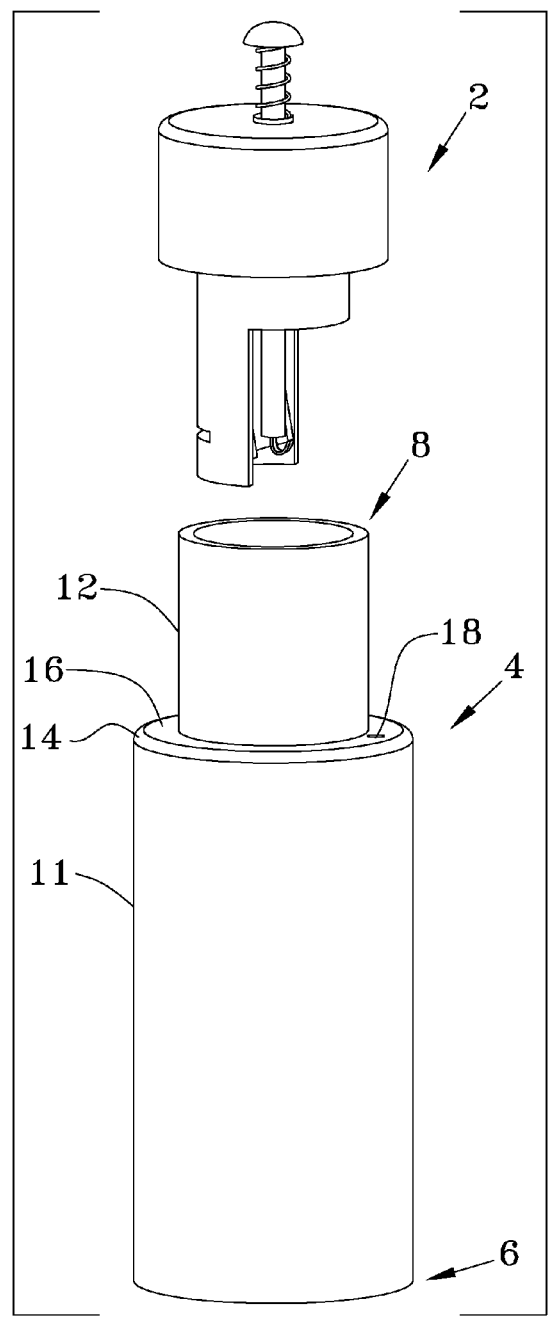
FIG. 1
FIG. 2

Replacement Sheet

PORTABLE FISHING LURE CLEANER

BACKGROUND OF THE INVENTION

The Pacific Northwest and Alaska are known worldwide for trout, steelhead, and salmon fishing. While numerous types of lures exist for enticing a fish to strike, two lures in particular produce unparalleled results when it comes to eliciting savage strikes from trout, steelhead, and salmon. Specifically, the Kwikfish® and the Flatfish® are staple lures of hobby fisherman and fishing guides alike. Known for their high-action, these lures they can be used at all trolling speeds, but can be just as effective when plunked or backtrolled. Years ago, fisherman discovered that wrapping their Kwikfish or Flatfish lures with baitfish fillets, such as smelt, herring, anchovies, and sardines greatly increased the number of strikes they received. Very simply, the scent emitted from the baitfish combined with the movement of the lure proved irresistible to fish. While there is some debate in the "best" way to wrap lure, it basically involves cutting a fillet from the baitfish of your choice, wrapping all or part of the fillet around the midsection of the lure, and then securing the baitfish to the lure with thread. While trout, steelhead, and salmon may be attracted to the smell of the baitfish, people are not. Once the fishing day is over, the lure is oily and smelly, and the fisherman or guide has no quick or convenient way of cleaning the lure, other than scrubbing it with a toothbrush over the side of the boat, possibly hooking his finger on the treble hooks in the process. What is needed is a compact, portable fishing lure cleaner.

SUMMARY OF THE INVENTION

The present invention is a compact, portable fishing lure cleaner. The lure cleaner securely holds a wide range of lure sizes and effectively removes the oil and scent of baitfish.

BRIEF DESCRIPTION OF THE DRAWINGS

FIG. 1 is an elevated perspective view of the lure cleaner of the present invention;

FIG. 2 is an elevated perspective view of the lure cleaner of the present invention with the cap removed;

DETAILED DESCRIPTION

Figure 3:
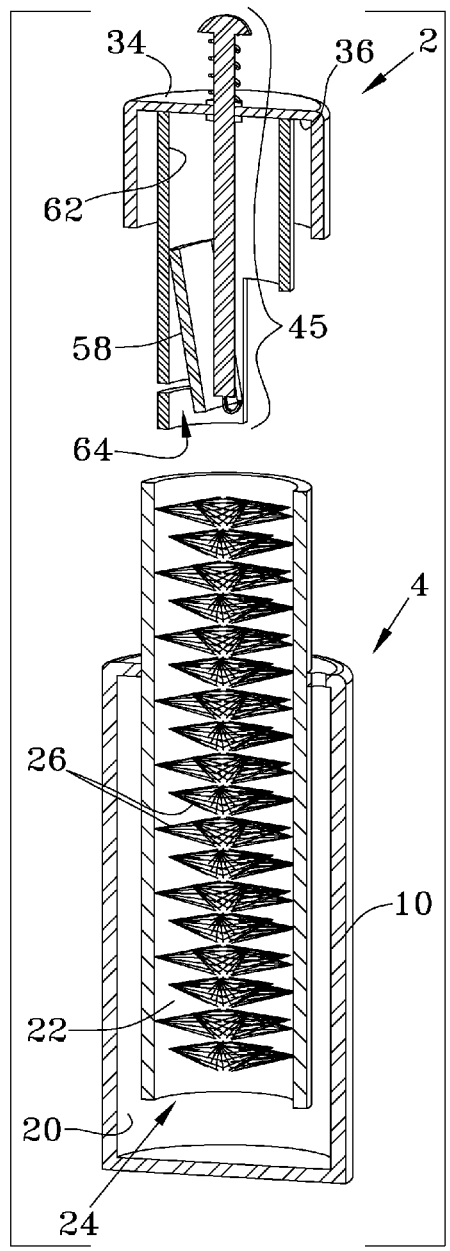
FIG. 3 is an elevated cross-sectional perspective view of the lure cleaner of the present invention with the cap removed.

In the following detailed description, reference is made to the accompanying drawings, which form a part hereof wherein like numerals designate like parts throughout, and in which is shown by way of illustration a specific embodiment in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Looking at FIGS. 1 and 2, an exemplary preferred embodiment of the portable fishing lure cleaner 10 of the present invention is illustrated. A generally cylindrical, elongated container 4 having a closed distal end 6 and open proximate end 8, and forming an inner chamber 20 (See FIG. 3) is shown. Container 4, as depicted in FIG. 2 comprises two distinct sections: a main body 11 and neck portion 12. A peripheral edge 14 and shoulder 16 delineate main body 11 from neck portion 12, with neck portion 12 extending from shoulder 16 and having a reduced diameter from that of main body 11. The reduced diameter is sized to matingly conform at the intersection of the lure nose retention means 28 of cap 2 into the cylindrical lure cleaning chamber 22 within the inner chamber 20 for rotational movement about neck 12. Draining orifice 18 is located on shoulder 16 and extends therethrough. Only visible in cross-section (See FIG. 3.), neck portion 12 extends into inner chamber 20, maintaining its reduced diameter and creating an elongated, cylindrical lure cleaning chamber 22, and terminating in second open end 24 that resides above the inner-face of distal end 6 of container 4. An array of cleaning bristles 26 is affixed about the interior wall of cleaning chamber 22. The arrangement, number, and attachment of cleaning bristles 26 is matter of design and not considered an essential part of the invention herein. The only requirements are that cleaning bristles 26 be attached in a manner so that they are not easily dislodged with use and that they are sufficient in number to adequately clean a fishing lure. Ideally, container 4 is made of a durable polymer; however, any durable material, such as stainless steel would be acceptable.

The elements of cap 2 are most clearly illustrated in FIGS. 10-14. Cap 2 comprises a lure nose retention means 28, concentrically nestled within a lid 30. Lid 30 is a cylinder closed at a proximate end and open at a distal end. Lure nose retention means 28 is rigidly affixed at its proximate end to the inner face 36 of lid 30's proximate end, as illustrated in FIG. 3. The inner diameter of lid 30 is sized for mating engagement about the exterior surface of the neck portion 12. The lure nose retention means 28 is sized such that its outside diameter is less than the inside diameter of neck portion 12. In this way, when cap 2 is placed on neck portion 12 of container 4, lure nose retention means 28 can reside inside neck portion 12, illustrated in FIG. 8.

Looking at FIG. 3 and FIGS. 11-14, lure nose retention means 28 is made of an open cylinder 29 with a partial cutaway, beginning at its approximate midpoint and extending to its distal, open end, and a concave wedge plate 58 extending from the inner face 62 of the open cylinder 29 at an angle downward towards its distal, open-end, so as to form a lure nose-securing gap 64 between inner face 62 of the open cylinder 29 and the convex face of the wedge plate 58, as illustrated in FIG. 3. The cutaway of the open cylinder 29 removes approximately 180° of material from the right cylinder configuration of the open cylinder 29. A capture slot 44 is cut through open cylinder 29 adjacent its distal end and is designed to help secure the nose of a smaller sized fishing lure within the portable fishing lure cleaner 10 of the current invention.

Looking at FIGS. 3 and 11-13 it can be seen that plunger member 46 extends normally from top face 34 of lid 30, and extends through lid 30 and lure nose retention means 28. Plunger member assembly 45, comprises a plunger member 46, with a hook 48 formed at a distal end 49 and a button 50 at a proximate end 51. A first plunger member seal 52 surrounds plunger member 46 and resides on top face 34, preventing liquid from passing through the orifice (not visible) through which plunger member 46 passes. A second plunger member seal 54 also surrounds plunger member 46, residing below the bottom face 36 of lid 30. First plunger member seal 52 and second plunger member seal 54 (See FIG. 6) work in conjunction to prevent liquid from passing through the orifice (not visible) through which plunger member 46 passes when the device is utilized.

Figure 6:
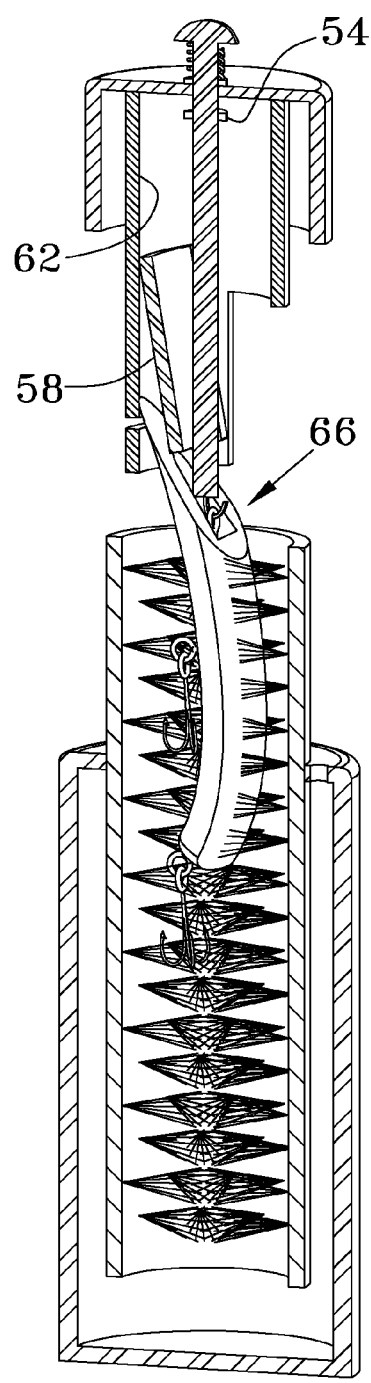
FIG. 6 is an elevated cross-sectional perspective view of the lure cleaner of the present invention with a large fishing lure secured within the cap (the fishing lure is not shown in cross-section)
Figure 7:
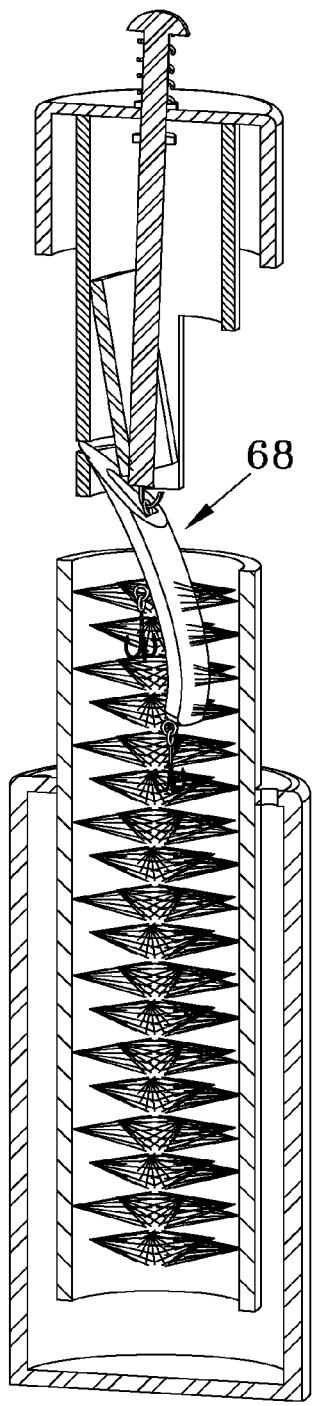
FIG. 7 is an elevated cross-sectional perspective view of the lure cleaner of the present invention with a small fishing lure secured within the cap (the fishing lure is not shown in cross-section).

Spring 56 surrounds plunger member 46, residing between first plunger member seal 52 and button 50. Spring 56 provides the retractable plunger-action allowing plunger member 46 to descend further towards lure cleaning chamber 22 and then return to its un-sprung position. FIG. 6 illustrates the sprung position, while FIG. 7 illustrates the un-sprung position of plunger member 46.

Figure 4:
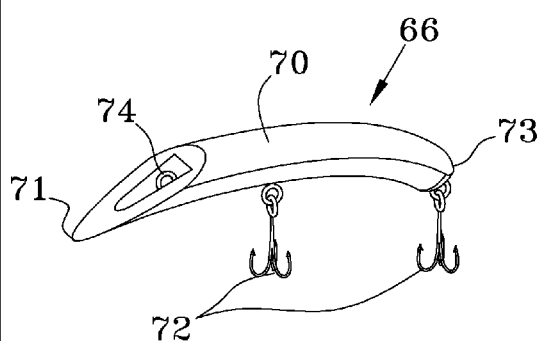
FIG. 4 is an elevated perspective view of a large fishing lure.
Figure 5:
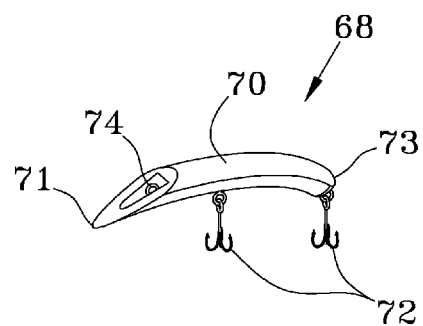
FIG. 5 is an elevated perspective view of a small fishing lure.

Portable fishing lure cleaner 10 is designed to accommodate both large fishing lures as illustrated in FIG. 4 as well as smaller lures, of which one is illustrated in FIG. 5. Large fishing lure 66 is substantially similar to small fishing lure 68, having the same component parts. Lures 66 and 68 only vary in dimensions and generally reside within the size specifications denoted K12-16 by Kwickfish. Lures 66 and 68 have an oblong body 70, with a pointed nose 71, a rounded bottom end 73, two treble hooks 72, and a screw-eyelet 74.

Figure 8:
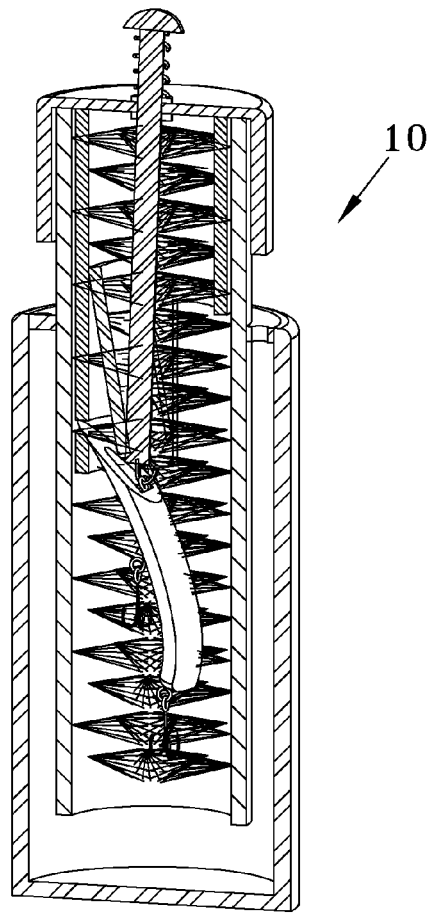
FIG. 8 is an elevated cross-sectional perspective view of the lure cleaner of the present invention with a small fishing lure secured within the cap and the cap frictionally engaged with the main body.

To use the portable fishing lure cleaner 10, the user first fills a portion of inner chamber 20 (which in turn fills a portion of lure cleaning chamber 22) with a combination of water and a suitable detergent. Second, the user attaches small fishing lure 68 to the hook 48 of plunger member 46 via the screw-eyelet 74, as is illustrated in FIG. 7. Depressing button 50, causes plunger assembly 45 to extend downward, allowing the user more physical space to secure lure 68 to hook 48. Next, pointed nose 71 is placed in slot 44, again illustrated in FIG. 7. For larger lure 66 the pointed nose 71 is placed not within slot 44 but simply resides wedged in lure nose-securing gap 64, as illustrated in FIG. 6. Releasing button 50, then "locks" lure 68 into place. Once the fishing lure is secured within cap 2, open portion 28 is placed within neck portion 10, such that the fishing lure resides within lure cleaning chamber 22 as is illustrated in FIG. 8. The user can now move cap 2 up-and-down, up-and-down, such that lure nose retention means is sliding in, and almost out of lure cleaning chamber 22, where the friction from bristles 26 combined with the water and detergent remove the oily residue and smell the baitfish created. Additionally, the user could also rotate cap 2 about neck 12, where the friction from bristles 26 combined with the water and detergent remove the oily residue and smell the baitfish created. Should the user desire to drain the water/detergent mixture from main body 4, drainage orifice 18 allows the user to do so without removing cap 2 from main body 4.

Figure 9:
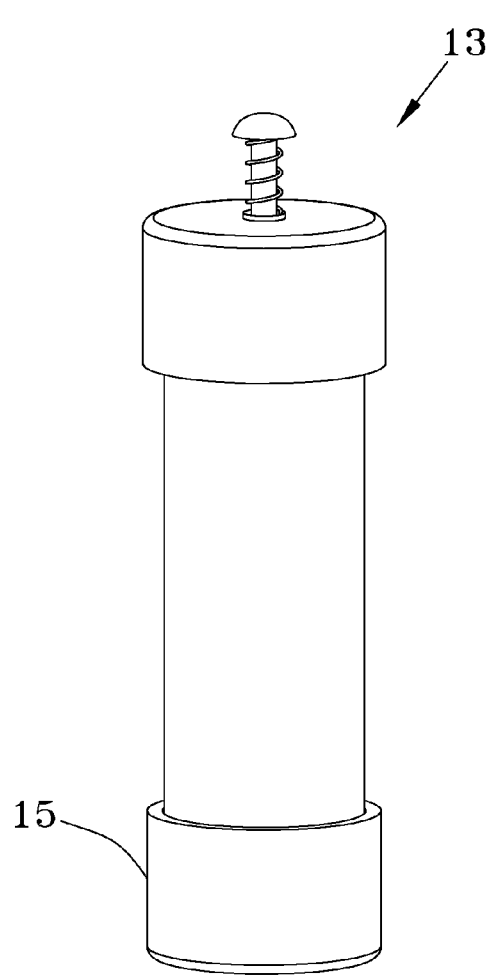
FIG. 9 is an elevated perspective view of an alternate embodiment of lure cleaner of the present invention.
Figure 10:
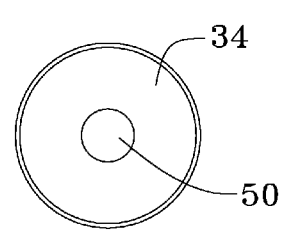
FIG. 10 is a top view of the cap of the fishing lure cleaner of the present invention.
Figure 12:
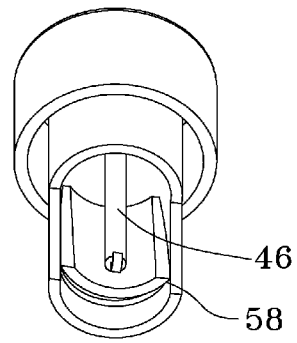
FIG. 12 is a bottom, perspective view of the cap of the fishing lure cleaner of the present invention.
Figure 11:
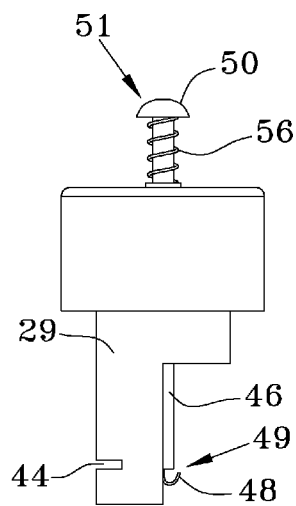
FIG. 11 is a left-side view of the cap of the fishing lure cleaner of the present invention.
Figures 13, 14:
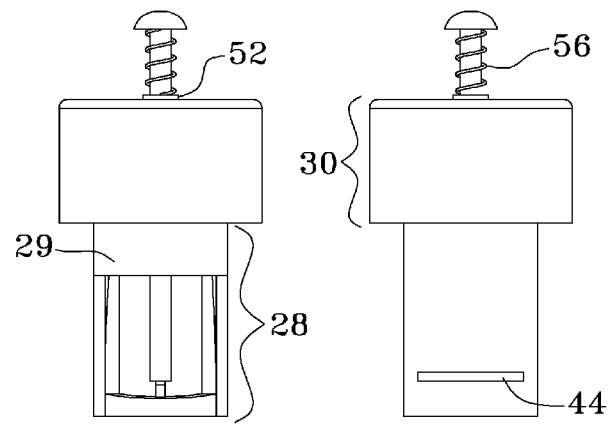
FIG. 13 is a front view of the cap of the fishing lure cleaner of the present invention.
FIG. 14 is a back view of the cap of the fishing lure cleaner of the present invention.

Finally, FIG. 9 illustrated an alternate embodiment fishing lure cleaner 13. Fishing lure cleaner 13 is of a singled-wall construction, creating a single interior chamber, from which cleaning bristles 26 are affixed about the interior wall of the chamber. A bottom screw-cap 15 allows the user to drain the cleaning fluid. This embodiment operates functionally identical to that of the preferred embodiment, only employing a slightly different container design.

Although specific embodiments have been illustrated and described herein, it will be appreciated by those of ordinary skill in the art that a wide variety of alternate and/or equivalent implementations calculated to achieve the same purposes might be substituted for the specific embodiments shown and described without departing from the scope of the present invention. Therefore, it is intended that this invention be limited only by the claims and the equivalents thereof.

The invention claimed is:

1. A fishing lure cleaning device comprising:
   a lure cleaning container having a closed distal end and an open proximate end;
   a lid conformed for mating engagement for rotational movement, with said proximate end of said container so as to create a first enclosed inner chamber, said lid having a top face and a bottom face;
   a lure nose retention means affixed within said lid;
   a retractable plunger member assembly extending through a top face of said lid and into said inner chamber; and
   an array of rigid bristles affixed in a cylindrical configuration within said container.

2. The fishing lure cleaning device of claim 1 wherein said plunger member assembly has a plunger member with a first end formed into a hook and a second end with a button affixed thereto, and wherein said hook resides within said lid and said button resides above said lid.

3. The fishing lure cleaning device of claim 2 wherein said plunger member assembly also has a compressible spring restrained between said button and a top face of said lid so as to allow said plunger member to be compressed such that said hook descends deeper into said container.

4. The fishing lure cleaning device of claim 3 wherein said plunger member has a first plunger member seal that surrounds said plunger member and resides on said top face of said lid and a second plunger member seal that surrounds said plunger member and resides on said bottom face of said lid.

5. The fishing lure cleaning device of claim 1 wherein said lure retention means is made of an open cylinder with a partial cutaway section, beginning at an approximate midpoint and extending to a distal, open end, and a concave wedge plate extending angularly from an inner face of said open cylinder so as to form a lure nose-securing space between said open cylinder and said wedge plate.

6. The fishing lure cleaning device of claim 5 wherein said lure retention means has a capture slot cut through a side wall of said open cylinder within said lure nose securing space.

7. The fishing lure cleaning device of claim 1 further comprising a drain orifice formed through said container.

8. The fishing lure cleaning device of claim 1 wherein said bristles are affixed about said inner chamber.

9. The fishing lure cleaning device of claim 1 further comprising a second enclosed inner chamber residing within said first enclosed inner chamber.

10. The fishing lure cleaning device of claim 9 wherein said bristles are affixed about said second enclosed inner chamber.

11. A fishing lure cleaning device comprising:
- a lure cleaning container having a closed distal end and an open proximate end;
- a lid conformed for mating engagement with said proximate end of said container so as to create an enclosed inner chamber, said lid having a top face and a bottom face;
- a lure nose retention means affixed within said lid;
- a retractable plunger member extending through said top face of said lid and into said inner chamber; and
- an array of rigid bristles affixed in a cylindrical configuration within said container.

* * * * *